US012797796B2

(12) United States Patent
Schultz et al.

(10) Patent No.: US 12,797,796 B2
(45) Date of Patent: Nov. 17, 2026

(54) REMOVAL OF FREE-UNLABELED CATIONIC AND ANIONIC SOLUTION PHASE RADIONUCLIDES FROM RADIOPHARMACEUTICALS USING SOLID-PHASE EXTRACTION TECHNIQUES

(71) Applicant: Viewpoint Molecular Targeting, Inc., Coralville, IA (US)

(72) Inventors: Michael K. Schultz, Coralville, IA (US); Mengshi Li, Coralville, IA (US); Edwin Sagastume, Coralville, IA (US)

(73) Assignee: VIEWPOINT MOLECULAR TARGETING, INC., Coralville, IA (US)

( * ) Notice: Subject to any disclaimer, the term of this patent is extended or adjusted under 35 U.S.C. 154(b) by 545 days.

(21) Appl. No.: 18/369,037

(22) Filed: Sep. 15, 2023

(65) Prior Publication Data

US 2024/0091705 A1 Mar. 21, 2024

Related U.S. Application Data

(60) Provisional application No. 63/407,410, filed on Sep. 16, 2022.

(51) Int. Cl.

*B01D 59/30* (2006.01)
*B01D 15/36* (2006.01)

(52) U.S. Cl.

CPC .......... *B01D 59/30* (2013.01); *B01D 15/361* (2013.01)

(58) Field of Classification Search

CPC ...... B01D 59/30; B01D 15/361; B01D 15/34; G21F 9/12
See application file for complete search history.

(56) References Cited

U.S. PATENT DOCUMENTS

2019/0194087 A1* 6/2019 Larsen .................. C07B 59/008

OTHER PUBLICATIONS

Porath "Gel Filtration: a Method for Desalting and Group Separation" Nature (1959) vol. 183, pp. 1657-1659 (Year: 1959).*
Molavipordanjani et al. "Basic and practical concepts of radiopharmaceutical purification methods" Jan. 2019, Drug Discovery Today, vol. 24, No. 1, p. 315-324 (Year: 2019).*

* cited by examiner

*Primary Examiner* — Anthony J Zimmer
*Assistant Examiner* — Syed T Iqbal
(74) *Attorney, Agent, or Firm* — Nyemaster Goode, P.C.

(57) ABSTRACT

The present invention relates to a process of removing free-unlabeled radionuclides from a radiopharmaceutical prior to administering the radiopharmaceutical to the patient using size-exclusion or ion-exchange mechanisms.

2 Claims, 3 Drawing Sheets

REMOVAL OF FREE-UNLABELED CATIONIC AND ANIONIC SOLUTION PHASE RADIONUCLIDES FROM RADIOPHARMACEUTICALS USING SOLID-PHASE EXTRACTION TECHNIQUES

BACKGROUND OF THE INVENTION

Radiopharmaceuticals are radiolabeled drugs that are used for imaging and therapy of disease. These drugs are designed of the form C-L-T, where C is a chelator that stably complexes (i.e., binds tightly) a radionuclide (e.g., Pb-212, Ac-225, Lu-177, Cu-64, Cu-67, Ga-68, Pb-203) that decays by various forms of radioactive decay modes (e.g., beta-particle emission, alpha-particle emission, positron emission, gamma-ray emission, auger electron emission); T is a targeting molecular structure (e.g., peptide, antibody, small molecule, aptamer) that is designed to bind to diseased cells, often by binding to a cell surface receptor (e.g., g-protein coupled receptor, type II glycoprotein, or other antigen); and L is a molecular linker that connects the chelator C to the binding moiety T.

The use of certain radionuclides that emit gamma rays enables imaging that is used often for diagnosing and monitoring of disease. Other radionuclides that emit particles, such as beta and alpha particles, are used for treating diseases, such as cancers. In some cases, the radionuclides intended for the treatment of cancer or other diseases, decay further to a series of radionuclide progeny (often referred to as daughter radionuclides or "daughters") that may or may not be complexed by the chelator. The preparation of radiopharmaceuticals involves a reaction of the C-L-T precursor with the radionuclide. Examples of radionuclides used for this purpose that have a series of daughter radionuclide progeny in their series includes Pb-212 and Ac-225 (FIG. 1).

Following the radiolabeling reaction and any purification step, these radionuclide progeny can build up in solution phase prior to administration of the radiopharmaceutical to the patient. This is problematic because the unlabeled daughter radionuclides that are not complexed to the C-L-T structure will circulate in the body with their own biochemistries, rather than binding to the intended diseased tissue target (e.g., cancerous tumors). This has the potential to cause unwanted toxicities for the patient because free radionuclides may bind and emit their radioactive particles and photons to the organelles of kidneys, liver, heart, lungs, and other organs.

There is a need in the industry for an effective means of removing free radionuclides from the radiopharmaceutical formulation after the production of the radiopharmaceutical and prior to the administration of the radiopharmaceutical to the patient for imaging and therapy.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

The present invention provides for a mechanism by which free radionuclides can be removed from the radiopharmaceutical formulation after the production of the radiopharmaceutical and prior to the administration of the radiopharmaceutical to the patient for imaging or therapy. In certain embodiments, gel filtration resin is used for the removal of free radionuclides (radionuclides that are not bound to a carrier molecule, e.g., peptide, small molecule, antibody) present in labeled drug products. These resins afford the purification of the radiopharmaceutical from unlabeled free daughter radionuclides by size exclusion or ion-exchange mechanisms. The size exclusion range can be from as small as 100 molecular weight of small molecules and peptides to much larger molecules such as antibodies in the range of 150,000 molecular weight. These solid phase materials may afford purification by retaining entities smaller than the molecular weight cut off or retain the radiometal impurities via ion exchange or extraction chromatography type binding. In the case of size exclusion, molecules that are greater in molecular weight than the molecular weight cut off pass through the resin while materials less then the molecular weight cutoff are retained. Thus, radiolabeled drug products are not retained by the resin while unlabeled ("free") radionuclides are retained within the resin.

DETAILED DESCRIPTION OF THE FIGURES

DETAILED DESCRIPTION OF THE INVENTION

Figure 1:
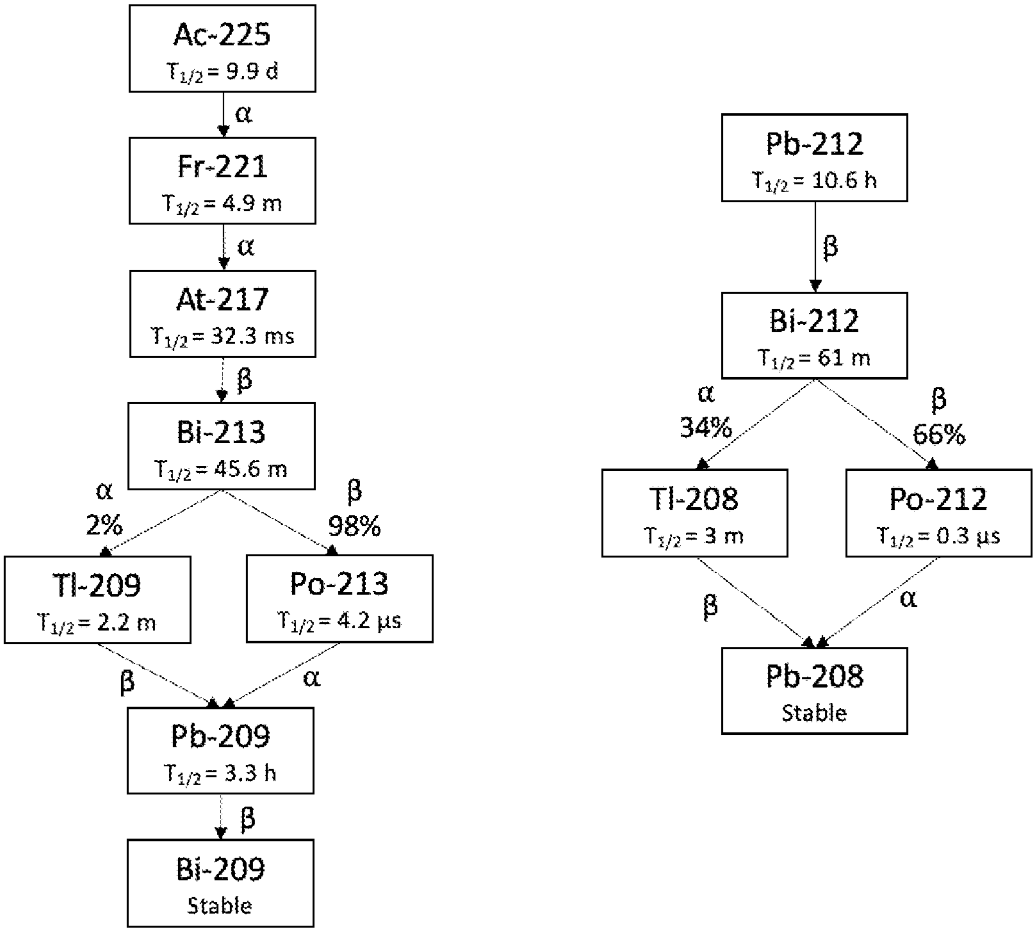
FIG. 1 illustrates Ac-225 (left) and Pb-212 (right) decay schemes.

The present invention describes a novel method of removing free radionuclides from a radiopharmaceutical formulation prior to its administration to a patient for imaging or therapy.

In accordance with the invention, "radiopharmaceuticals" are radioisotopes bound to biological molecules that are able to target specific organs, tissues or cells within the human body. These radioactive drugs can be used for the diagnosis and/or for the therapy of diseases. A radiopharmaceutical is made up of a radionuclide and a vehicle molecule with high affinity, or binding power, for a tissue or a specific function of a human organ. Radiopharmaceuticals are used to produce images of organs or tissues of interest by a process known as scintigraphy. A gamma camera is able to detect the gamma rays emitted by the radioisotope to produce images that reflect the function of the organ or tissue under investigation. Technetium-99m and 2-deoxy-2-[$^{18}$F]fluoro-glucose (FDG) are the most commonly used radiopharmaceuticals for SPECT and PET imaging, accounting for 80% of all nuclear medicine procedures. However, any radiopharmaceutical is appropriate for use in the present invention.

In accordance with the methods of the invention, free radionuclides are removed from the radiopharmaceutical formulation using size exclusion chromatography (SEC or gel filtration) or ion exchange. Gel filtration is used to separate a wide range of molecules according to size, including proteins (enzymes), polysaccharides and nucleic acids. The methods and compositions associated with the use of gel filtration and ion exchange chromatography are well known to persons skilled in the art.

Ion exchange chromatography involves the separation of ionizable molecules based on their total charge, and is commonly used to separate charged biological molecules. Depending on the pH of their environment, proteins may carry a net positive charge, a net negative charge, or no charge. The pH at which a molecule has no net charge is called its isoelectric point, or pl. The pl can be calculated based on the primary sequence of the molecule. The choice of buffer pH then determines the net charge of the protein of interest. In a buffer with a pH greater than the pl of the radionuclide, the radionuclide will carry a net negative charge. Therefore, a positively charged anion exchange resin is chosen to capture the radionuclide. In a buffer with a pH lower than the pl of the radionuclide, the radionuclide will carry a net positive charge. Therefore, a negatively charged cation exchange resin is chosen. When an ion exchange chromatography column is loaded with a sample at a particular pH, all radionuclides that are appropriately charged will bind to the resin.

The basic components of gel filtration are the matrix (i.e. stationary phase), chromatography column, and the elution buffer. The matrix can should have fractionation range appropriate for the size of the free radionuclides targeted for removal, and can range anywhere from 100 daltons to 150,000 daltons. Likewise, the column(s) should be prepacked with the appropriate matrix for separation of the sample mixture. Frits are typically used to retain the packing material in the column.

Typical buffers used as mobile phases for cation exchange chromatography include (along with their pka values): formate (3.8), acetate (4.6), MES (6.1), phosphate (7.2) or tris (8.1), while buffers that are used as mobile phases for anion exchange chromatography include tris, piperazine (9.7) and diethylamine (11). To maintain the desired pH, the concentrations of buffers should typically be in the range of 20-50 mM.

For cation exchange chromatography, the elution buffer pH is maintained in the range 4-7 and for anion exchange in the range 7-11. The selected pH must support binding of the target analyte with the stationary phase and should be close to its pI values to enable its release from the column. At very low or very high pH values, the analytes, especially proteins, may bind strongly to the stationary phase, requiring high salt concentrations for their elution. In addition, some proteins may precipitate or lose their activity at high pH values and high salt concentrations. The pH of the start buffer should be 0.5 to 1 pH unit above or below the pI of the target analyte for anion exchange and cation exchange chromatography respectively. The concentration of the starting buffer must be carefully optimized to ensure effective separation. Normally, the concentration of the starting buffer needed to maintain the column is in the range of 5 to 20 mM.

Buffers containing as much as 300 to 500 mM of salts such as sodium chloride, potassium chloride, sodium bromide, sodium sulfate or sodium acetate are typically used for elution. If necessary, additives such as urea, sugars or detergents are added to increase the solubility of the analytes, prevent their precipitation or to ensure analyte stability by inhibiting enzyme activity. However, the additives may become charged at the working pH and can interfere with the separation.

As the pH of the buffer determines the ionization state of a molecule, the pH of the sample buffer is maintained at 0.5 to 1.5 pH unit above or below the pI value of analyte of interest. This ensures that the molecules are charged appropriately for either anion exchange or cation exchange chromatography. Although the choice of buffer will depend on the sample matrix, start buffers are most suitable for sample preparation. If a different buffer is used, then it can be exchanged with the start buffer prior to analysis. Samples present in high ionic strength solutions can be diluted with the start buffer prior to loading, as long as it does not have contaminants such as detergents. Viscous samples are difficult to inject and separate; these must be diluted with the start buffer. In addition to pH, the ionic strength of the sample buffer plays an important role in achieving good resolution. Hence the sample has to be desalted and its buffer exchanged for the start buffer. The sample must be filtered to remove particulates before loading it onto the column.

For optimal resolution, the mass of the analyte(s) should not exceed the binding capacity of the column, as recommended by the manufacturer. The run time and percentage change of ionic strength over time have to be optimized to achieve the desired resolution. Often, a step pH gradient is preferred over a linear pH gradient as the latter is difficult to create accurately and reproducibly. The highest possible flow rate at which the resolution is not impacted can be used to improve throughput. Higher flow rates can be used during column regeneration and re-equilibration to save time.

In one embodiment of the invention, the resin or matrix is a cross-linked dextran gel, such as Sephadex. Cross-linked dextran gel is a spherical gel formed by cross-linking of dextran through epichlorohydrin. The cross-linking degree and mesh size of the gel are determined by the concentration of sugar and the amount of crosslinking agent. Any size dextran gel is appropriate for use in the invention and is generally selected based upon the size of the radionuclide to be isolated. In one embodiment, small dextran gel (G-10, G-15, G-25, G-50) is used in the gel filtration.

The following examples are offered to illustrate but not limit the invention. Thus, it is presented with the understanding that various formulation modifications as well as method of delivery modifications may be made and still are within the spirit of the invention.

EXAMPLE

Isolation of PB-212

In the present example, a Sephadex G-10 resin was used to demonstrate that the method allows for (1) remove free radiometals from various solutions; and (2) the carrier molecule to pass through the column unretained for administration to the patient.

Figure 2:
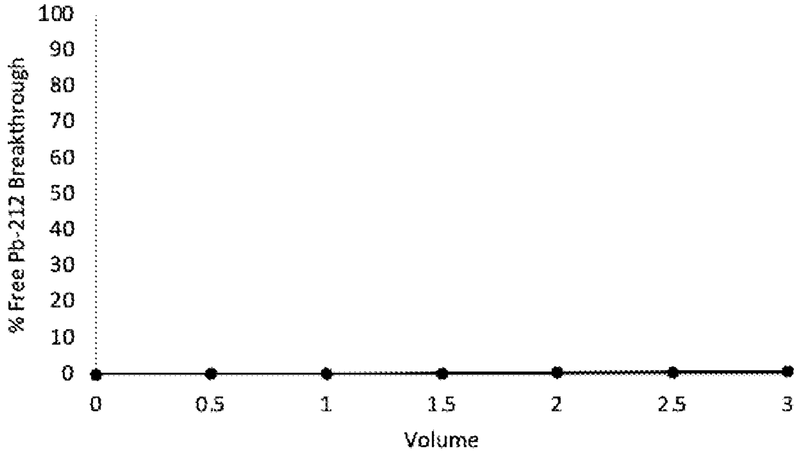
FIG. 2 is a graph illustrating that cumulative free Pb-212 that is not retained in on a column containing 60 mg Sephanex G-10 resin.

In this example, an empty 1 mL solid phase extraction (SPE) tube with 20 micron polyethylene frits was filled with 60 mg of Sephadex G-10 resin. A solution containing unlabeled Pb-212 was rinsed through the column and the amount of Pb-212 that was not retained relative to the amount loaded was determined (% Pb-212 breakthrough). Studies resulted in a total of 3% free Pb-212 that was not captured by the G-10 resin (FIG. 2) demonstrating the resin's excellent ability to remove free radiometals from solution (i.e., 97% removal).

Figure 3:
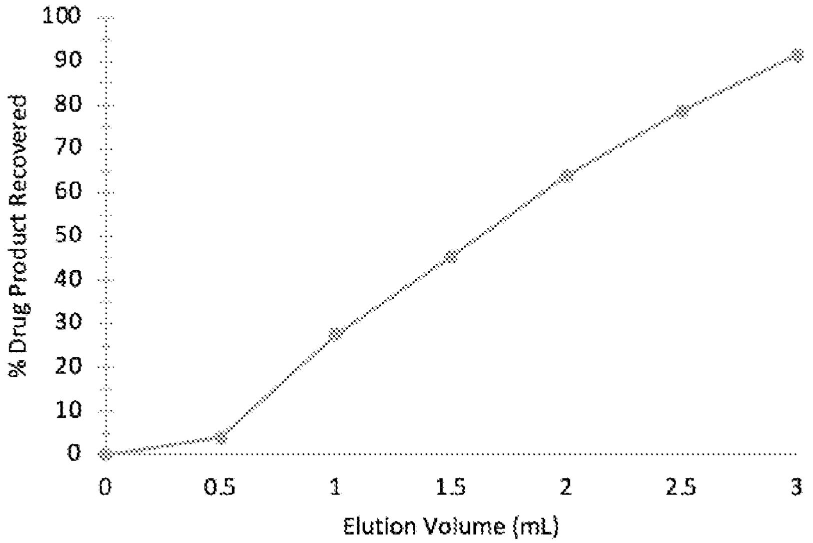
FIG. 3 is a graph illustrating a [212Pb]VMT01 recovery from a column containing 60 mg Sephadex G-10 resin.

In a separate study with an identical column, Pb-212 radiolabeled drug product ([$^{212}$Pb]VMT01) was passed through the column and the amount of drug product that could be collected was measured (FIG. 3). VMT01 is a peptide with a molecular weight of approximately 1700. Results from this study demonstrated that low quantities of drug product were lost to the resin (<10%).

Thus, the combination of these two studies demonstrates that a resin can be used to remove radiometal daughters from radiopharmaceutical drug products to ensure that the radiopharmaceutical administered to a patient is of the highest purity possible.

It should be appreciated that minor dosage and formulation modifications of the composition and the ranges expressed herein may be made and still come within the scope and spirit of the present invention.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

The foregoing description has been presented for the purposes of illustration and description. It is not intended to be an exhaustive list or limit the invention to the precise forms disclosed. It is contemplated that other alternative processes and methods obvious to those skilled in the art are considered included in the invention. The description is merely examples of embodiments. It is understood that any other modifications, substitutions, and/or additions may be made, which are within the intended spirit and scope of the disclosure. From the foregoing, it can be seen that the exemplary aspects of the disclosure accomplishes at least all of the intended objectives.

The invention claimed is:

1. A method of removing free radionuclides from a radiopharmaceutical formulation comprising the steps of: placing the radiopharmaceutical formulation in a column comprising a resin, whereby unbound radionuclides in the radiopharmaceutical formulation are retained in the resin and the radiopharmaceutical product is purified of and isolated from free radionuclides in the solution; whereby the radiopharmaceutical formulation is a solution selected from the group consisting of Pb-212, Ac-225, and Th-227.

2. The method of claim 1, wherein the radiopharmaceutical formulation is a Pb-212 solution.

* * * * *